(12) United States Patent
Wilf et al.

(10) Patent No.: US 7,184,100 B1
(45) Date of Patent: Feb. 27, 2007

(54) METHOD OF SELECTING KEY-FRAMES FROM A VIDEO SEQUENCE

(75) Inventors: Itzhak Wilf, Neve Monoson (IL); Ovadya Menadeva, Modin (IL); Hayit Greenspan, Kfar Bilu (IL)

(73) Assignee: MATE - Media Access Technologies Ltd., Yehud (IL)

( * ) Notice: Subject to any disclaimer, the term of this patent is extended or adjusted under 35 U.S.C. 154(b) by 0 days.

(21) Appl. No.: 09/647,199

(22) PCT Filed: Mar. 24, 1999

(86) PCT No.: PCT/IL99/00169

§ 371 (c)(1),
(2), (4) Date: Apr. 11, 2001

(87) PCT Pub. No.: WO99/51022

PCT Pub. Date: Oct. 7, 1999

(51) Int. Cl.
*H04N 5/76* (2006.01)

(52) U.S. Cl. ...................... 348/700; 382/107
(58) Field of Classification Search ............. 348/722, 348/107, 171, 173, 225
See application file for complete search history.

(56) References Cited

U.S. PATENT DOCUMENTS

| | | | |
|---|---|---|---|
| 5,635,982 A * | 6/1997 | Zhang et al. | 348/231.99 |
| 5,835,163 A | 11/1998 | Liou et al. | |
| 5,900,919 A * | 5/1999 | Chen et al. | 348/700 |
| 5,911,008 A * | 6/1999 | Niikura et al. | 382/236 |
| 6,393,054 B1 * | 5/2002 | Altunbasak et al. | 375/240 |
| 6,400,374 B2 * | 6/2002 | Lanier | 345/630 |
| 6,549,643 B1 * | 4/2003 | Toklu et al. | 382/107 |
| 6,711,587 B1 * | 3/2004 | Dufaux | 707/104.1 |
| 6,782,049 B1 * | 8/2004 | Dufaux et al. | 375/240.01 |
| 6,807,306 B1 * | 10/2004 | Girgensohn et al. | 382/225 |

* cited by examiner

*Primary Examiner*—Paulos M. Natnael
(74) *Attorney, Agent, or Firm*—Pearl Cohen Zedek Latzer LLP

(57) ABSTRACT

A method of selecting key-frames (230) from a video sequence (210, 215) by comparing each frame in the video sequence with respect to its preceding and subsequent key-frames for redundancy where the comparison involves region and motion analysis. The video sequence is optionally pre-processed to detect graphic overlay. The key-frame set is optionally post-processed (250) to optimize the resulting set for face or other object recognition.

26 Claims, 20 Drawing Sheets

111

Picture L

112

Picture M

113

Picture R

121

122

123

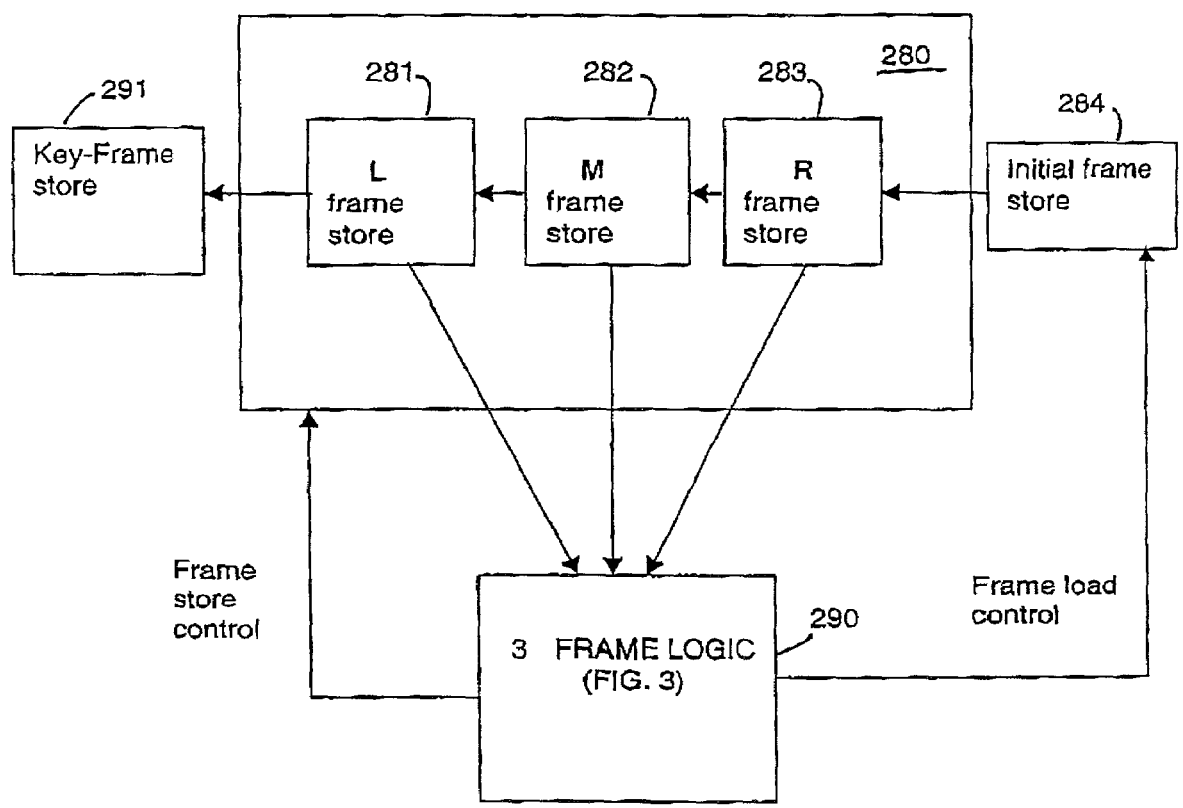
FIGURE 2.A

451

$\Delta_L, (i = 0)$

452

$\Delta_R, (i = 0)$

453

$Minpics(\Delta_L, \Delta_R)$

461

$\Delta_L, (i=1)$

462

$\Delta_R, (i=1)$

463

$Minpics(\Delta_L, \Delta_R)$ $$S^L = S^R(i=0)$$

$$S^L(i=1)$$

$$S^R(i=1)$$

METHOD OF SELECTING KEY-FRAMES FROM A VIDEO SEQUENCE

BACKGROUND OF THE INVENTION

1. Field of the Invention

The present invention relates to video indexing, archiving, browsing and searching. More particularly, the invention relates to a method for selecting key-frames from a video image sequence to produce a subset of key-frames which represent the sequence concisely and which can be used for later automatic searching.

2. Brief Description of the Prior Art

The amount of video data stored in multimedia and other archives grows very rapidly which makes searching a time consuming task. Both time and storage requirements can be reduced by creating a compact representation of the video footage in the form of key-frames, that is a reduced subset of the original video frames which may be used as a representation of the original video frames. The present invention describes methods for selecting such key-frames.

A coarse key-frame representation can be obtained by detecting the boundaries between camera shots. A shot is an unbroken sequence of frames from one camera.

In video post-production, different types of transitions or boundaries between shots are used for processing the video footage. A cut is an abrupt shot change that occurs in a single frame. A fade is a slow change in brightness usually resulting in or starting with a solid black frame. A dissolve occurs when the images of the first shot get dimmer and the images of the second shot get brighter, with frames within the transition showing one image superimposed on the other. A wipe occurs when pixels from the second shot replace those of the first shot in a regular pattern such as in a line from the left edge of the frames.

Shot transitions of the cut type are generally easy to detect. By computing a suitable difference metric between a pair of images, that metric is computed for each frame and the preceding frame. A local maximum (over time) of the metric which is above threshold usually indicates a scene change of the cut type.

Several image difference metrics have been proposed. Some are based on distance between color histograms. Other relate to the difference image obtained by subtracting the images pixel by pixel. Fast variants of the latter approach are based on low resolution versions of the images. For compressed image streams, some implementations utilize compressed image coefficients directly. For example, it is possible to utilize the DC components of the blocks in a JPEG compressed images as a low resolution image. Thus it is not necessary to decompress the images before analyzing the video sequence for scene changes.

In the case of a gradual transition, it is more difficult to distinguish such a transition from changes occurring by motion. Several solution approaches are based on fitting specific models of transitions to the image sequence.

The detection of shot boundaries (or scene changes) is important to the movie structure. By selecting a representative frame from each shot, a coarse representation of the content is obtained. Such a representative frame is usually the first frame of the shot. In motion shots however, a single representative frame cannot capture the content of the entire shot.

The usual prior art technique key-frame selection is illustrated in FIG. 1A. The first frame of the shot I is recorded as a key-frame (box 101). The next frame K is loaded (box 102) and then the difference between frames I and K is computed (box 104). If that difference is above the threshold (test 106), then frame K is selected as the next key-frame (box 107). Otherwise, K is incremented (box 105) and the difference—threshold operation is repeated. When the last frame of the shot is reached (test 103) the key-frame selection process is terminated for the current shot.

Such a technique tends to produce too many key-frames. This can be seen by observing three consecutive key-frames of the same shot, (for example 111, 112 and 113 in FIG. 1B). Although there is an apparent difference between the first and the second frames as well as between the second and the third frame, many times the second frame seems redundant in view of the first and the third frames.

In several types of programming, such as sports and news, graphic overlays which include text and symbols (e.g., logos) are superimposed on the live video content. Such superimposing is generally done by character generators. While the graphic overlays are generally displayed at a constant image location and exhibit only temporal variations, (namely appearance and disappearance), in other cases the overlay may be moving (e.g. scrolling).

A graphic overlay example for a static shot is depicted in FIG. 1C. According to the prior art techniques of FIG. 1A, the first frame of the shot will be selected as a key-frame. If the change from frame 121 to frame 122, which is mostly due to the appearance of the text, does not suffice to drive the difference measure above the threshold (box 106), then frame 122 will not be selected as a key-frame, and the video text will not be visible in the selected video key-frames.

The identity of people, or other specific objects such as the White House, appearing in a video program is a major information source. Therefore, further automatic video indexing might very well include automatic object (e.g. face) recognition. Automatic recognition of objects is done by storing one or several views of each such object in the database. When processing an object query, the queried object is compared against the representation of the objects in the database. Machine ability to recognize faces, for example, is rapidly degraded when the person is facing away from the camera (non-frontal view), or looking sideways, or when the face is partially occluded.

The prior art describes methods for face detection and recognition in still images and in video image sequences. That art does not teach how to select key-frames such that face (or other object) regions can be later detected and recognized with high probability of success. In a system for browsing and automatic searching, which is based on key-frames, the key-frames extraction and the automatic searching are separate processes. Therefore, unless special consideration is given to face content of the video, changes in face orientation, or small amounts of occlusion, can go undetected by the generic key-frame logic.

For example, FIG. 1D shows a sequence of frames. Using prior art methods such as the one described in FIG. 1A, the first frame 131 will be selected as a key-frame, while frame 138 is probably much better for face recognition.

It is clear that in motion shots it is necessary to select more frames. While it is possible to sample the time-interval between two scene changes evenly, such a scheme is wasteful for slow changes and inadequate for fast changes as it may miss rapid events.

From the discussion above, it is seen that the prior art techniques of key-frames selection produce too many key-frames, or miss overlays, or fail to select the best frames for recognition of faces or other predetermined objects.

(1) OBJECTS OF THE INVENTION

An object of the present invention is to provide methods for key-frame selection having advantages in the existing methods in one or more of the above respects.

Another object of the present invention is to provide methods for representing the content of a video sequence by key-frames to enable the user to browse and search the key-frames instead of the original content, thus reducing online storage requirements as well as searching time.

Other objects of the invention are to avoid the above-described shortcomings of the prior art methods by basing the key-frame selection on the content of the video frames so as to produce a minimum number of key-frames without missing rapid events or overlays, and to select the best frames for recognition of faces or other predetermined objects

SUMMARY OF THE INVENTION

According to one aspect of the present invention, there is provided a method of selecting key-frames from a video sequence to produce a subset of key-frames for indexing, archiving, browsing and/or searching purposes, comprising: (a) producing an initial set of frames from the video sequence; (b) introducing each frame of the initial set sequentially into a 3-frame buffer to include a middle frame M, its preceding frame L, and its succeeding frame R; (c) testing for redundancy each M frame with respect to its preceding L frame and its succeeding R frame; and (d) selecting as a key-frame for inclusion in the subset those M frames tested to be non-redundant.

According to another aspect of the invention, there is provided a method of selecting key-frames from an initial set of frames to produce a subset of key-frames for indexing, archiving, browsing and/or searching purposes, comprising: testing for redundancy each frame of the initial set with respect to at least its preceding frame by: representing the tested frame as a combination of geometric transformations applied to selected regions in the preceding frame; subtracting the geometric transformation of the preceding frame from the tested frame to produce difference images; and determining from the difference images whether or not the tested frame is redundant.

More particularly, the redundancy test in the described preferred embodiment is effected by: iteratively identifying motion entities having relative motion between the tested frame and its preceding frame; utilizing the identified motion entities for identifying regions in the tested frame that can be transformed from the preceding frame into the tested frame; transforming the identified regions in the tested frame to the corresponding regions in the preceding frame; measuring the difference images; measuring the areas of the difference images; by counting the number of pixels of an intensity value above a predetermined threshold and discarding the tested frame when the measured areas are less than a prespecified area threshold.

According to a further aspect of the present invention, there is provided a method of selecting key-frames from a video sequence, which includes overlayed frames having graphic overlays superimposed on live video content, and non-overlayed frames having live video content without superimposed graphic overlays: the method comprising: masking out from the overlayed frames the superimposed graphic overlays; testing for redundancy the live video content of neighboring overlayed frames and non-overlayed frames; and selecting as key-frames the overlayed frames and non-overlayed frames whose live video contents were tested to be non-redundant.

According to a still further aspect of the present invention, there is provided a method of key-frame selection from a video sequence comprising: detecting at least one predetermined image in the video sequence; tracking the at least one image through the video sequence to produce a series of image frames; computing at least one image-based metric for the image from the series of image-frames; and selecting a key-frame from the series of image frames based on the at least one image-based metric.

According to a still further aspect of the present invention, there is provided a method of selecting key-frames from a video sequence, comprising: selecting one subset of key-frames which represent at least one feature of the video sequence; selecting at least one other subset of key-frames which represent at least one other feature of the video sequence; and combining the at least two subsets of key-frames to produce a combined set of key-frames.

The present invention thus also optimizes the selection of key-frames with respect to video, graphic overlays and/or face content of the video sequence. Graphic overlays are detected from the video sequence and masked out prior to key-frame selection based on video content. Key-frames which capture the overlay content are separately selected. The two subsets of key-frames, that is the live video key-frames and the graphic overlay key-frames are merged to a final, combined set of key-frames. In addition, the face content (or content of another predetermined object) of the video sequence is analyzed by detecting and tracking such features. An image-quality metric is computed for each such track and is used for selecting the image key-frames from the original video sequence. The various subsets of key-frames may be merged into a combined set of key-frames; and such combined set may be further reduced in number by applying further redundancy tests applied with respect to adjacent pairs of frames, or with respect to three adjacent frames as briefly described above and as to be more particularly described below.

BRIEF DESCRIPTION OF THE DRAWINGS

FIG. 2A depicts the 3-frame buffer system architecture.

DESCRIPTION OF PREFERRED EMBODIMENTS OF THE INVENTION

Figure 2:
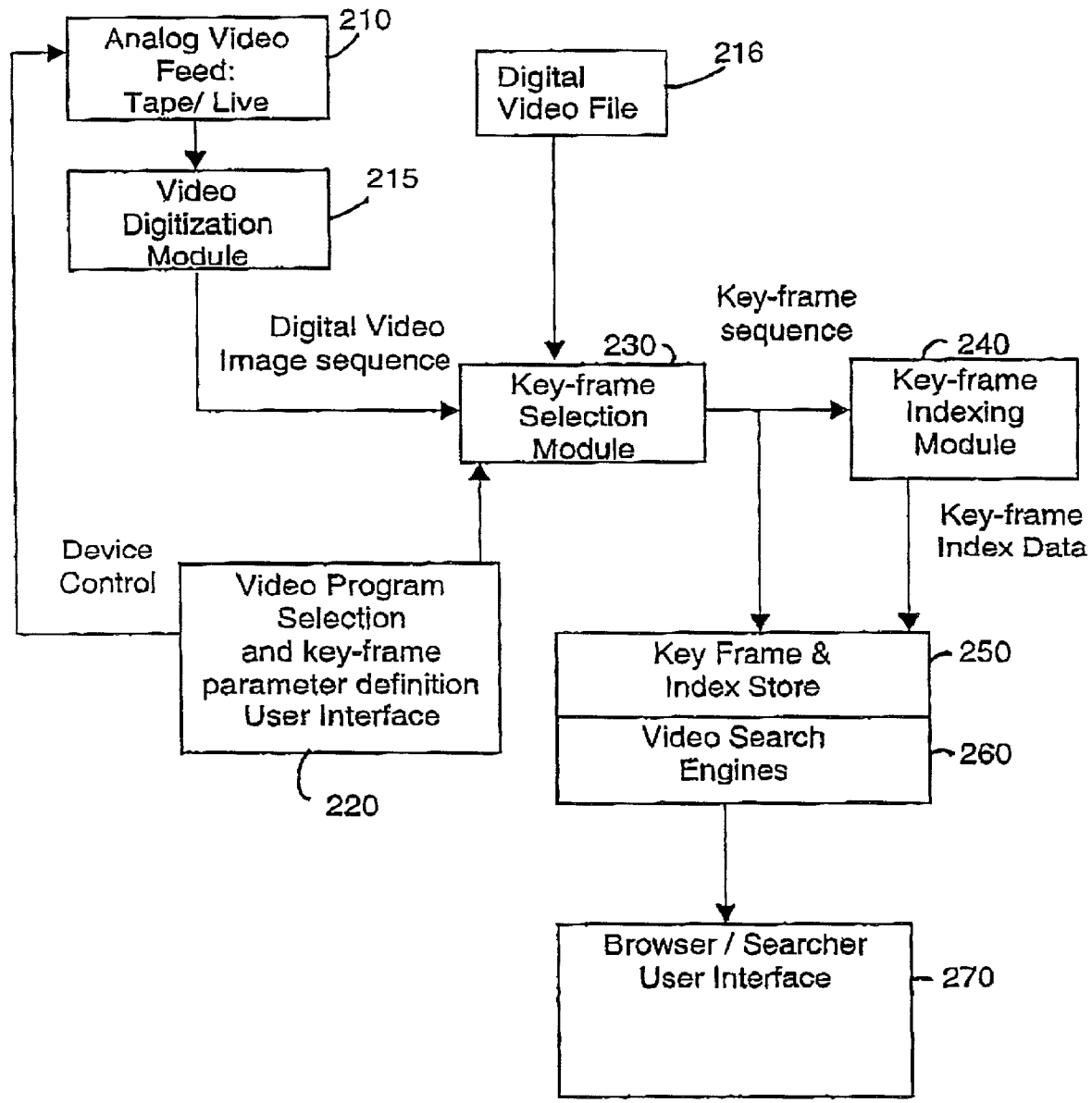
FIG. 2 illustrates a system for video browsing and searching which uses key-frames.

A system for video browsing and searching, based on key-frames, is illustrated in FIG. 2. A video image sequence is inputted from a video feed module 210. The video feed may be a live program or one recorded on tape. Analog video is digitized in video digitizer 215. Optionally, the system may receive digital representation directly from a digital video file 216. The video source, the program, and the digitization parameters and key-frame selection parameters are all controlled by the user from a user interface console 220. The digitized video image sequence is received by the key-frame selection module 230, which is primarily the subject of the present invention.

The selected key-frames are optionally processed further by a key-frame indexing module 240, and the key-frames, together with any computed index data, are stored in the key-frame and index store 250. This key-frame and index data can then be accessed by browser/searcher module 270. In browsing, a user may review key-frames instead of the original video, thus reducing storage and bandwidth requirements. Content-based queries can be defined and processed by video search engines 260.

A primary purpose of the present invention is to provide a method of selecting a reduced set (subset) of key-frames to serve as a representation of the original video image sequence for further browsing and searching. The invention also provides a method for key-frame selection when the video image sequence consists of live video content with a graphics (e.g., text or logo) overlay, and/or images of predetermined objects, e.g., face images. The invention further provides a method of modifying the image key-frames for the purpose of improving subsequent recognition of a predetermined face (or other predetermined object) in order to permit the face (or other object) recognition to be performed only on key-frames.

The initial set of frames from which the key-frames are selected may consist of the entire initial sequences of video frames. Alternatively it may be produced by even, dense sub-sampling, (e.g., by selecting every n$^{th}$ frame from the video sequence, where "n" is great than "1"), or by selecting frames based on a distance metric between frames, or on a two-frame redundancy test as described in the prior art.

The process does not require prior explicit detection of scene changes. The key-frames selected by the process include all scene changes as well as other key-frames based on video content, graphics overlays, and/or face or other predetermined objects. Key-frame classification may be performed during or after the key-frame selection process.

As will be described below, particularly with respect to FIGS. 3, 4a and 5, each frame of the initial set is introduced sequentially into a 3-frame buffer to include a middle frame M, its preceding frame L, and its succeeding frame R. Each M frame is tested for redundancy with respect to its preceding L frame and its succeeding R frame; and the M frame is discarded when tested to be redundant, i.e., it is selected as a key-frame for inclusion in the subset only when tested to be non-redundant.

The 3-frame buffer system architecture included in the key-frame selection module 230 of FIG. 2 is shown in FIG. 2A at 280, and the three frames therein are denoted L (281), M (282), and R (283). A first set of three frames are initially streamed into the buffer from the frame store (284), and a three-frame analysis is performed by a logic module 290. Module 290 performs a key-frame selection process on the contents of the 3-frame buffer as described in FIG. 3. Module 290 controls the load process from the frame store 284 into the 3-frame buffer 280. It also controls the three-frame store inside the 3-frame buffer, and the report of the selected key-frames. The selected key-frames are stored (and optionally classified as cut/transition) in module 291.

Each M frame is tested for redundancy, with respect to its preceding L frame and its succeeding R frame, by: representing the M frame as a combination of geometric transformations applied to selected regions in the L and R frames; subtracting the geometric transformation of the L and R frames from the M frame to produce difference images; and determining from the difference images whether or not the M frame is redundant.

In the example described below, the transformations between the M and L frames, and between the M and R frames, are based on edge points. It will be appreciated, however, that such transformations could be based on other corresponding points or other features of the images in the respective frames.

Figure 3:
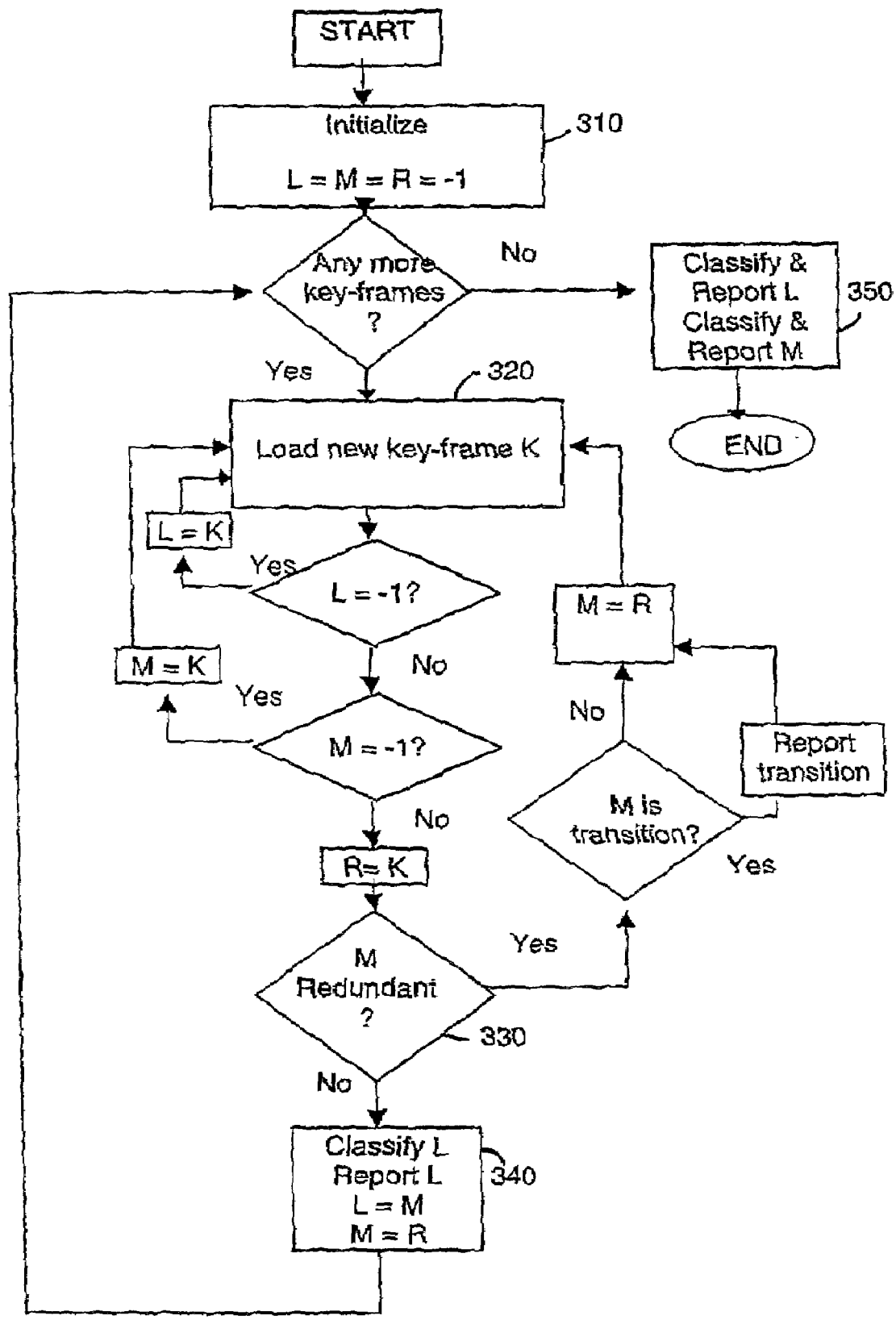
FIG. 3 is a flow chart of a redundancy testing method for key-frame selection using the 3-frame buffer system of FIG. 2A.

The main loop of the key-frame selection process is described in FIG. 3, wherein the main test in the loop is the redundancy test of block 330. This consists of a motion redundancy test which is performed on the three frames M, L, R, in buffer 280, as more particularly described in FIG. 4A. This form of redundancy may be due, for example, to M being in the middle of a transition from L to R.

In the case that M is not redundant (box 340), L is pushed out of the buffer as a selected key-frame. It is classified (cut, transition, or motion key-frame). Then a new frame from the inital set is pushed into the 3-frame buffer 280. Where M is redundant, it is overridden by pushing frame R to become the M frame, and a new frame from the initial set is introduced into the R-frame position.

When no more frames of the first set are left, the remaining two frames in the buffer 280 are outputted (box 350) as key-frames.

Figure 1A:
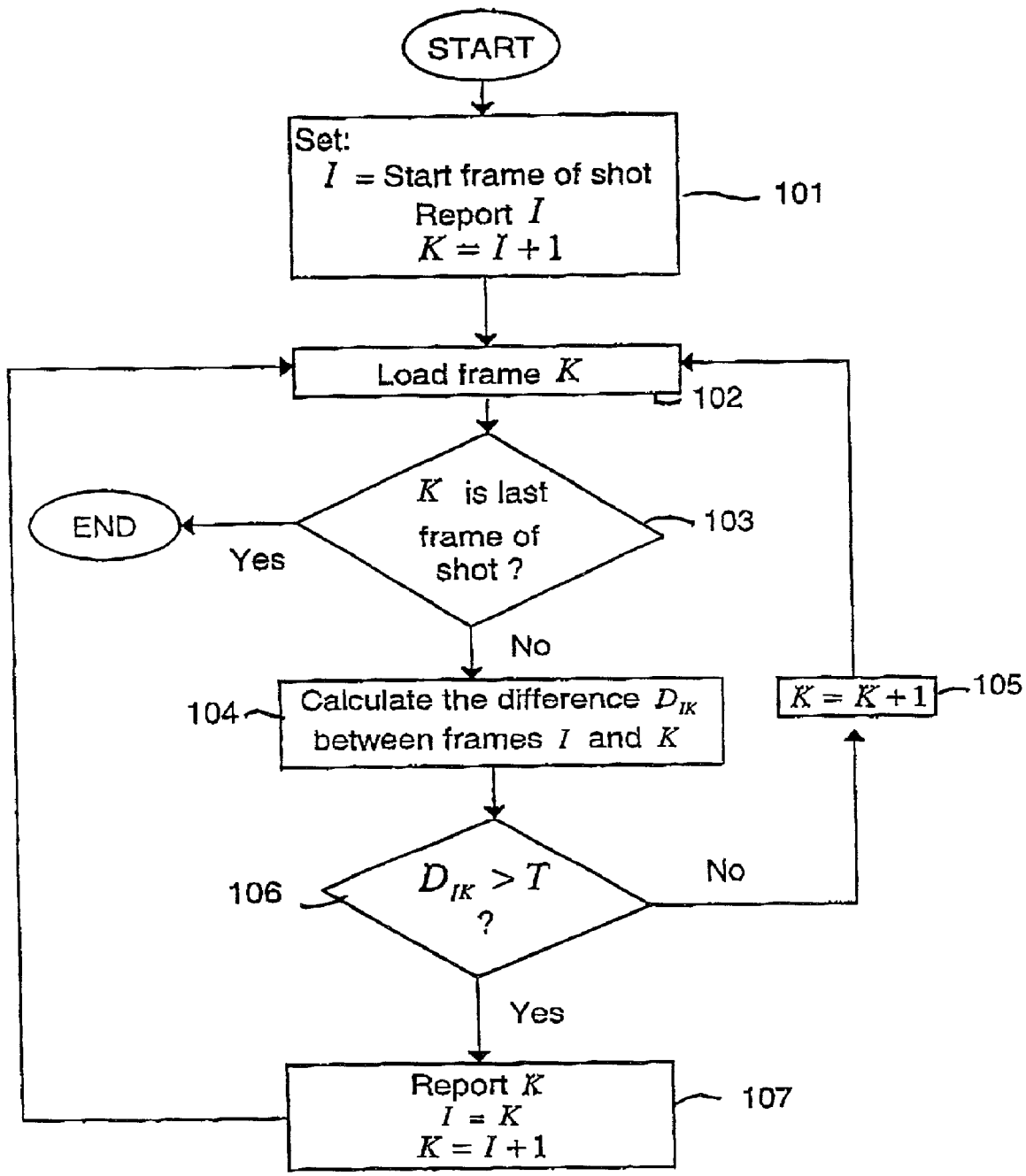
FIG. 1A is a flow chart of a known key-frame selection method.
Figure 1B:
FIG. 1B illustrates a sequence of three key-frames from a motion video shot
Figure 1B:
Figure 1B:
Figure 1C:
FIG. 1C illustrates a sequence of frames from a static scene, with a graphic overlay.
Figure 1C:
Figure 1C:
Figure 1D:
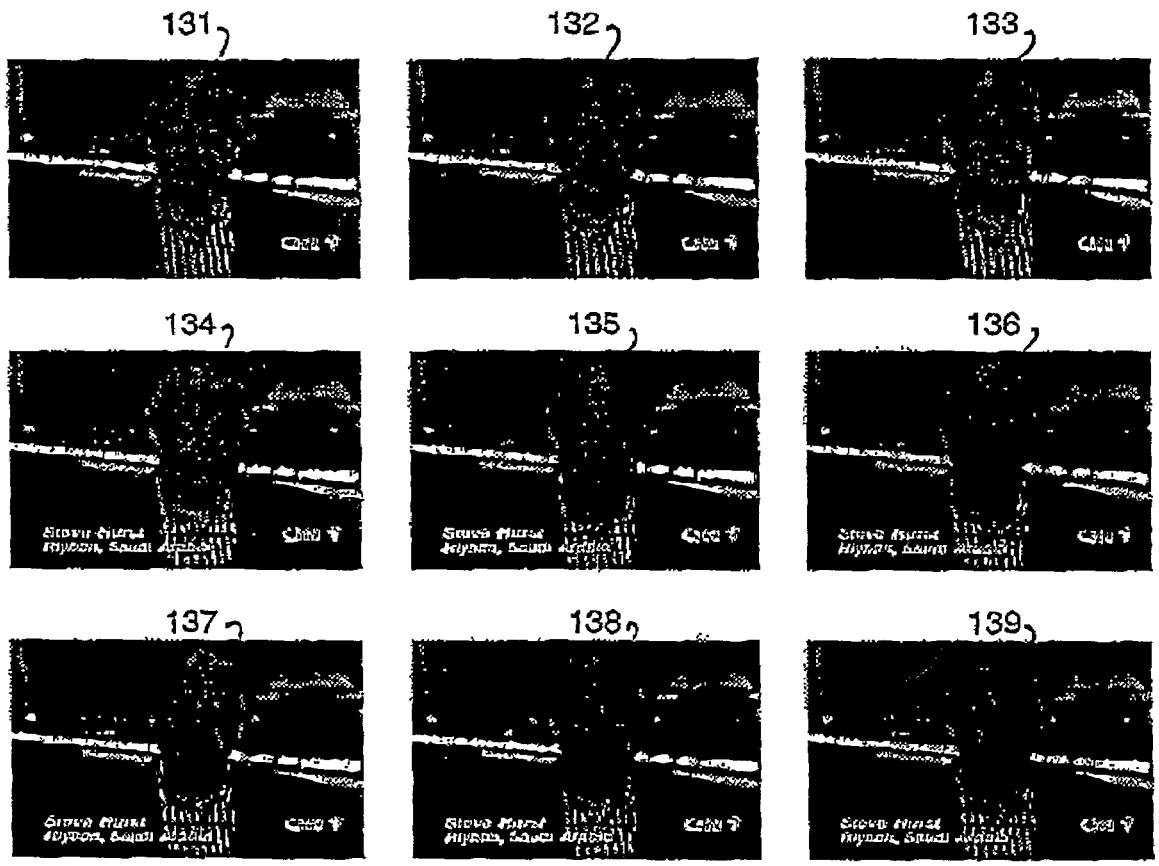
FIG. 1D is a sequence of frames from a static face scene.
Figure 4A:
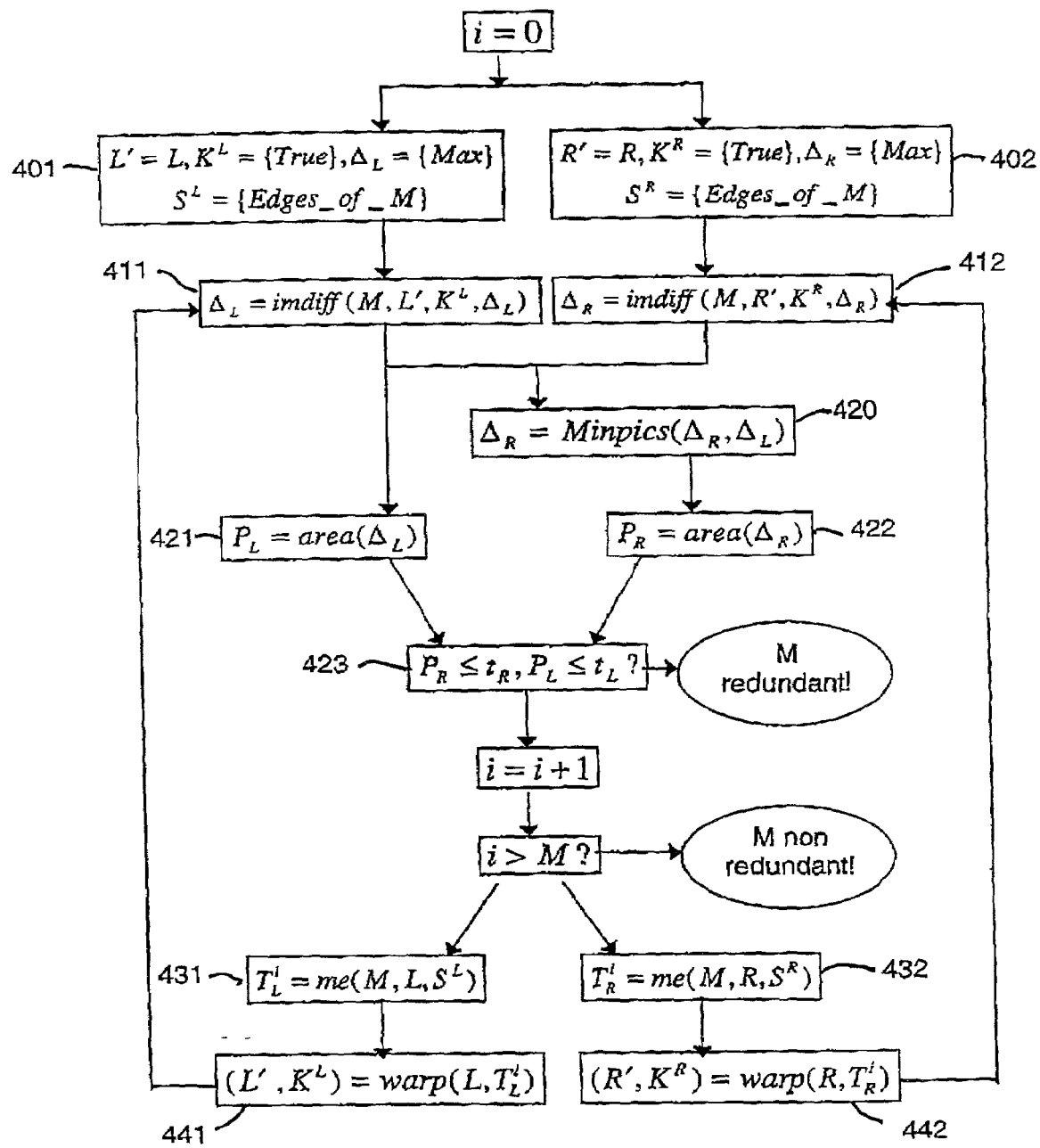
FIG. 4A is a flow chart more particularly illustrating the key-frame redundancy test.
Figure 5:
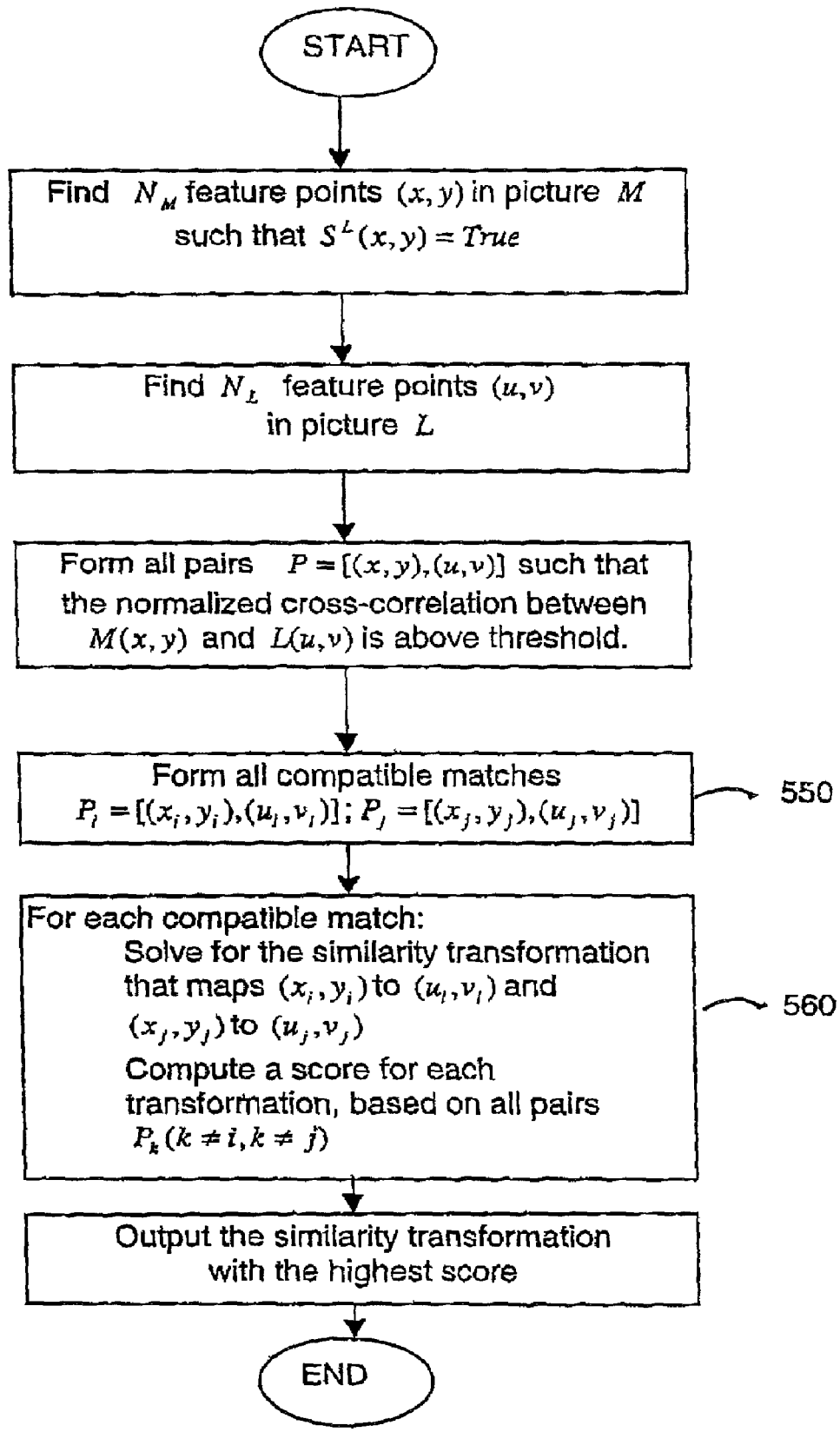
FIG. 5 is a flow chart for solving a similarity transformation between regions in two images.

The test for motion redundancy is described in FIG. 4A. The input to the test procedure consist of three key-frames of the initial set, denoted by L, M and R. An example of three such frames is depicted in FIG. 1B. Thus, the sequence of these frames L, M, R, exhibit two motion entities having relative motion with respect to each other, namely: (1) the background or camera motion, and (2) the foreground individual motion. One can qualitatively observe that frame M seems redundant in view of the visual content of frames L and R, i.e., both motion entities present in frame M are sufficiently similar to those present in frame L or in frame R such that frame M can be considered redundant and discarded from the subset of key-frames being selected.

The parameters utilized in FIG. 4A, are defined as follows:
N=the number of iterations selected beforehand, usually 2–5;
i=iteration counter;
L', R'=motion entity;
$K^L, K^R$=pixel mask;
$\Delta_L, \Delta_R$=difference image;
$S^L, S^R$=support for motion estimation; high-gradient points in static image;
$P_L, P_R$=area of the difference images ($\Delta_L, \Delta_R$)
$T_L^i, T_R^i$=transformation between M and L and between M and R, based on edge points in ($S^L, S^R$);

The flow chart illustrated in FIG. 4a executes the test for redundancy by: iteratively identifying motion entities having relative motion between the M frame, its preceding L frame, and its succeeding R frame (blocks 401, 402); utilizing the identified motion entities for identifying regions in the M frame that can be transformed from the L and R frames into the M frame (blocks 431, 432); transforming the identified regions in the M frame to the corresponding regions in the L and R frames (blocks 431, 432); measuring the differences between the identified regions and the corresponding transformed regions in the M frame to produce difference images ($\Delta_L, \Delta_R$; blocks 411, 412); measuring the areas of the difference images (blocks 421, 422) by counting the number of pixels of an intensity value above a predetermined threshold; and discarding the M frame when the measured areas are less than a prespecified area threshold (block 423).

More particularly, in the initialization step 401 in FIG. 4A, L' is initialized to L; the mask $K^L$ includes all pixels; the difference image $\Delta_L$ is set to the maximum possible distance value at all image pixels; and the support for motion estimation $S^L$ is initialized to all edge points in M.

It will be seen that a basic step in the procedure is step 411 for L and M (step 412 for R and M) where a geometrically transformed version, L' of L, is subtracted from M, for all image pixels, such that $K^L$=True; i.e., subtract only the region for which the transformation was applied (using mask $K^L$). Then, the following operations are performed repeatedly until redundancy has been decided as being present, or N iterations have been executed:

a. The pixelwise absolute image difference ($\Delta_L$) between M and L' is computed in pixels where $K^L$ is set. The corresponding image difference value $\Delta_L$ is replaced by the least of its present value and the pixelwise absolute image difference (step 411).
b. $\Delta_R$ is set to the pixel minimum value between $\Delta_R$ and $\Delta_L$ (step 420).
c. $\Delta_L$ and $\Delta_R$ pass a pixel intensity threshold stage, and their respective areas (i.e., the number of pixels that pass the intensity threshold) comprise the values, $P_L, P_R$ (steps 421, 422).
d. The motion redundancy decision is made by testing the difference area values (step 423). If both $P_L$ and $P_R$ are less than an area threshold value, M is redundant.
e. The transformation $T'_L$ between M,L is computed based on the edge points in $S^L$ (step 431).
f. All edge points that are accounted for by said transformation are erased from $S^L$.
g. L' is computed by geometrically transforming L by applying the inverse of $T'_L$. $K^L$ is set to the region of L that has been transformed (step 441).

Figure 4B:
FIGS. 4B, 4C, 4D show intermediate results of the key-frame redundancy test.
Figure 4B:
Figure 4B:

With respect to the example pictures in FIG. 18, FIG. 4B depicts the difference images $\Delta_L$ and $\Delta_R$ prior to any motion estimation. It is apparent that while the two-frame differences are high, taking the minimum value of these pictures reduces the difference significantly.

Figure 4C:
Figure 4C:
Figure 4C:
Figure 4D:
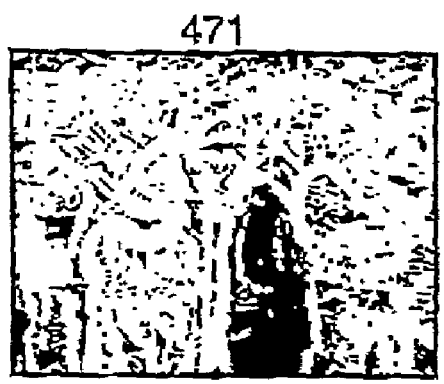
Figure 4D:
Figure 4D:

FIG. 4C depicts the level of redundancy obtained after a first motion processing step. The binary masks used in motion estimation are depicted in FIG. 4D. The initial mask (top) serves to estimate the background (or camera) motion. As a result, after compensating for the background motion, the middle and bottom mask focus on the foreground individual's motion.

The described method is independent of the specific method of motion estimation used. A suitable method must be able to cope with "long motion" situations. For completeness, FIG. 5 describes a preferred embodiment for solving a similarity transformation between regions of two images based on feature point matching.

In step 550 of FIG. 5, compatibility of matches is decided as follows:
Consider the vectors $\nabla_{xy}=(x_j-x_i, y_j-y_i)$ and $\nabla_{uv}=(u_j-u_i, v_j-v_i)$, then;
$|\nabla_{xy}|$, should be longer than a specified threshold length to ensure stability of the solution;
The ratio $$\frac{|\nabla_{xy}|}{|\nabla_{uv}|}$$

should conform with expected zoom factors;
The normalized cross-product between $\nabla_{xy}$ and $\nabla_{uv}$ should be sufficiently close to 1.0;
In step 560, the score is computed as follows:
Let $$\begin{bmatrix} a & -b & 0 \\ b & a & 0 \\ c & d & 1 \end{bmatrix}$$

be the similarity transformation matrix in homogeneous coordinates, then the score consist of the number of pairs such that the distance between $(ax_k+by_k+c, -bx_k+ay_k+d)$ and $(u_k, v_k)$ is less than a threshold.

Where some of the frames in the initial set include overlayed frames having graphic overlays (e.g., text, logo's) superimposed on live video (picture) content, and non-overlayed frames having only live-video content, a pre-processing step is performed to remove the graphics overlay from the overlayed frames in the initial sequence. Thus, before each M frame is tested for redundancy, a mask is produced of the graphics overlay and is utilized to remove the graphics overlay from the live video content in the overlayed frame. The redundancy test is then made with respect to the live video content in both the overlayed frames and the non-overlayed frames such that a subset of key-frames is produced for the live-video content in both the overlayed frames and the non-overlayed frames in the initial sequence. One or more additional key-frames may be produced for the graphics overlay and may be merged with the key-frames of live video content.

Figure 6:
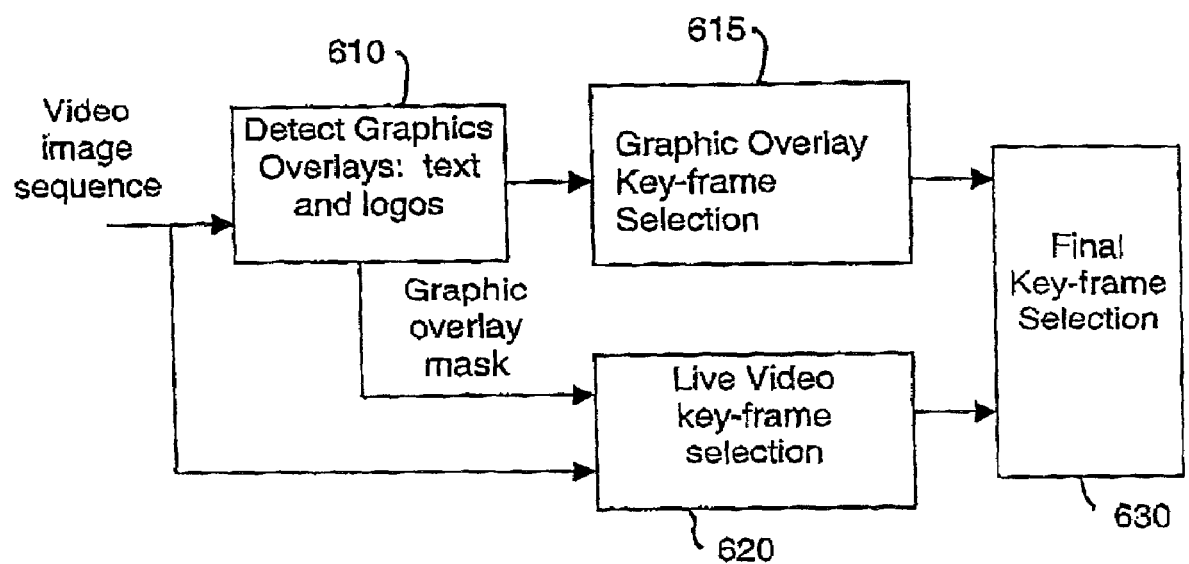
FIG. 6 is a flow chart for first selecting, and then combining, graphic overlay key-frames and live video key-frames

FIG. 6 is a flow chart for selecting graphic overlay key-frames, e.g., text key-frames and logo key-frames, and combining them with the live video key-frames. In step 610, the text and logos in the overlayed frames are detected. The overlayed frames are used to select key-frames which represent the overlay content in step 616. They are also used to mask out the text and logo regions from the live video, to facilitate key-frame selection based on live video content, which is performed in step 620. In a preferred embodiment, a live video mask is computed such that the mask value equals 0 in a suspected text/logo region and equals 1 otherwise. Thus, with respect to the flow chart in FIG. 4A, in steps 401 (402) the difference images $\Delta_L(\Delta_R)$ and $S^L(S^R)$ are multiplied by the mask values.

Following live video key-frame selection in step 620, the two subsets of key-frames are combined in step 630, FIG. 6, to a single, combined set of key-frames.

Figure 7:
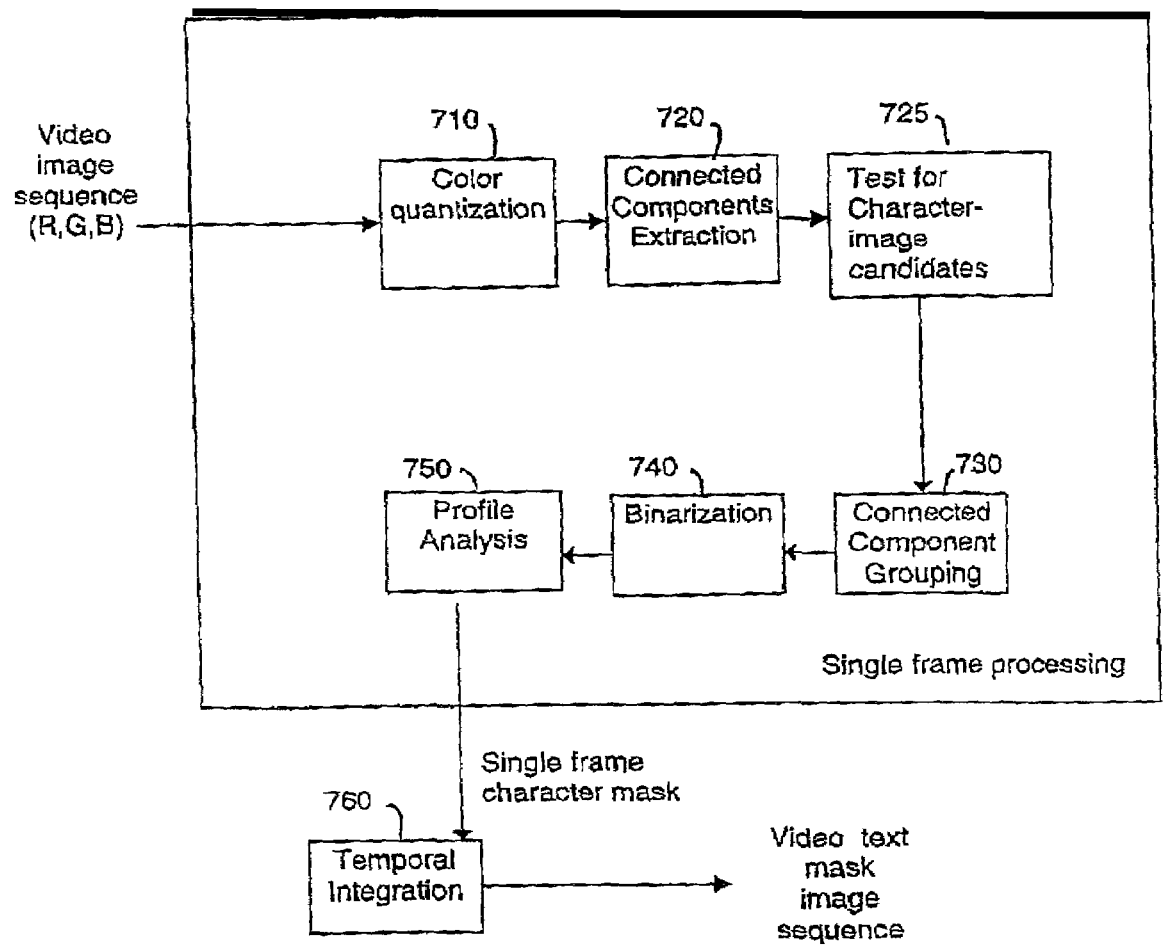
FIG. 7 is a flow chart for detecting text-like graphics regions in a video image sequence.

The procedure for text detection in step 610, FIG. 6, is outlined in FIG. 7.

It consists of the following steps:

The color space of the video frame is quantized to a few color levels (typically 4 to 10). This is done by reducing the number of bits of the R, G, and B components, and then merging similar color triplets (710). For each color index, the connected components of pixels that map into that color index are formed (720).

The connected components are tested for being character image candidates (725). The test consists of dimensions, aspect ratio, and fill factor for the bounding rectangle.

Connected components that have passed the previous test are grouped into test string candidates based on location (step 730). Each string obtained as described above assumes a single text color. Color analysis is repeated inside the bounding rectangle of the candidate text string. The result of that analysis is a binary image where text pixels are denoted by a True value (step 740).

Following binarization, horizontal and vertical projections of the binary text string images are computed, and profile analysis is conducted to verify that the candidate string has in fact text-shape characteristics (750).

The single frame text image analysis is repeated for a set of frames of the original video sequence. The single frame results are filtered over time (760) for two purposes: (a) reducing false detection probability; and (b) finding in and out time indices for each overlay, for the purpose of selecting graphic overlay key-frames at selected significant time codes (such as the in-index, out-index, mid-segment, etc).

The time-filtered bounding rectangles of candidate text stings are used to generate masks for the live video key-frame detection process previously defined.

Figure 8:
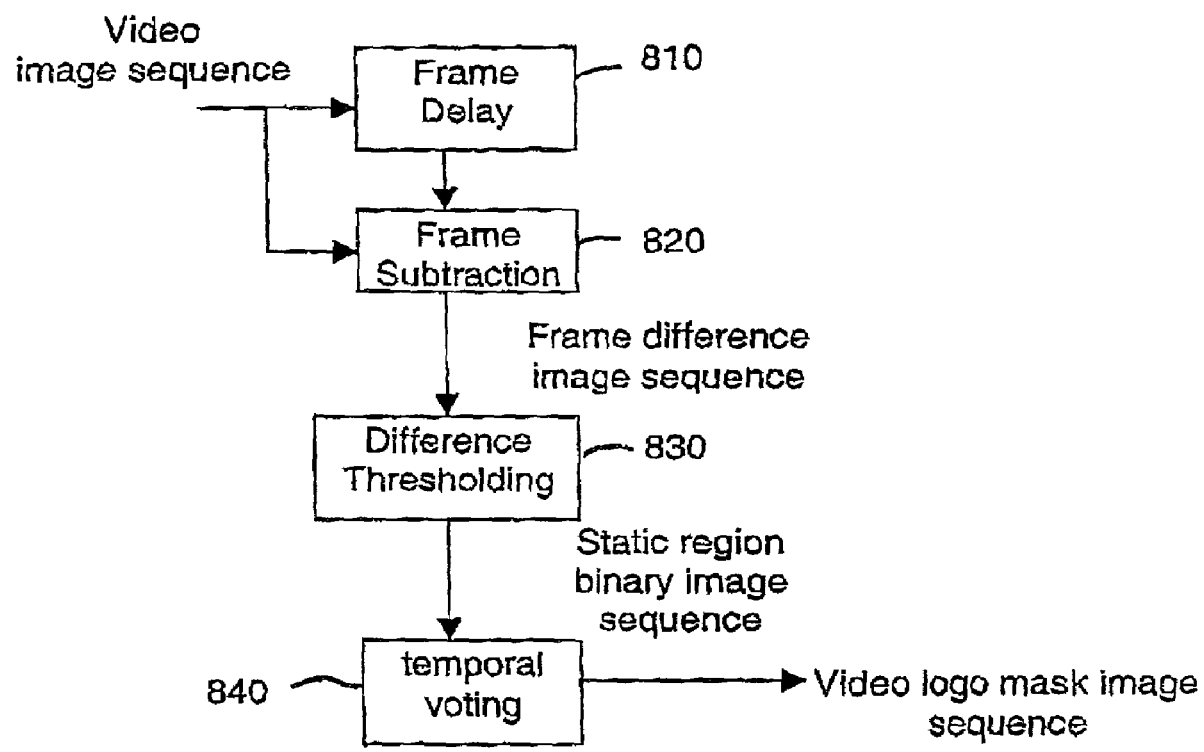
FIG. 8 is a flow chart for detecting logo graphics regions in a video image sequence.

While several types of logos can be detected by the text process, some logos lack the string structure which is a part of that logic, and therefore may be missed. However, logos are generally static and appear for long periods of time. A special logo detection process is outlined in FIG. 8.

The video frame is subtracted by frame subtraction module 820, after the frame delay (block 810). Static elements such as logos are detected after the difference thresholding 830. While in a short time interval (such as two frames), many regions are stationary, by integrating static region detection over time by a voting process 840, only fixed elements such as logos are selected.

Once detected, logos are masked out from the input video sequence, prior to the live-video key-frame selection process. In addition, a logo key-frame is selected, e.g., according to a predefined quality metric or a predefined time code index as in the text key-frame selection.

When the text and logo key-frames have been selected, they are combined with the live-video key-frames, per FIG. 6.

Where at least some of the frames in the initial set contain a facial image, or an image of another predetermined object (e.g., the White House, the Eiffel Tower, etc.), at least one of such frames is selected as a key-frame for inclusion in the subset; and the key-frame subset is optionally post-processed to optimize the resulting subset for face or other object recognition. This is done by detecting the facial image (or other object image) in the image sequence, tracking that image through the video sequence, computing at least one image-based metric for the image, and selecting one or more key-frames of the video sequence based on the at least one image-based metric. The image-based metric preferably includes an image self-similarity index to select interim key-frames, and an image quality index to select a final key-frame therefrom.

Figure 9:
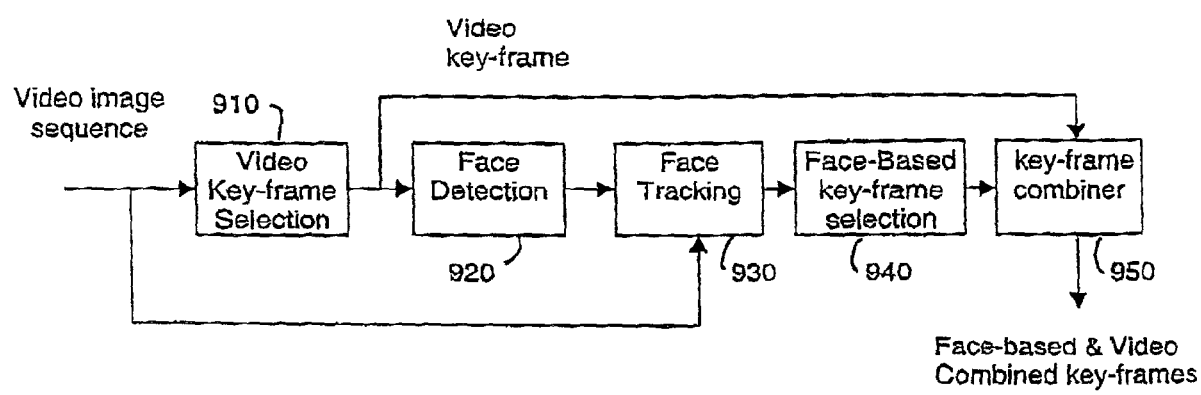
FIG. 9 is a flow chart for selecting key-frames based on detecting and tracking face-like regions (or regions of other predetermined objects).

FIG. 9 is a flow chart for extracting and combining a face or other predetermined object (e.g., the White House) key-frames with other live video key-frames. First a live video key-frame selection process (910) is performed on this initial sequence to extract key-frames in which face-like (or other object-like) regions are detected (module 920). These face-like regions are tracked between corresponding key-frames, using the original video image sequence (module 930), and face-based key-frames are extracted (module 940), and combined with the live video key-frames (module 950).

Figure 10:
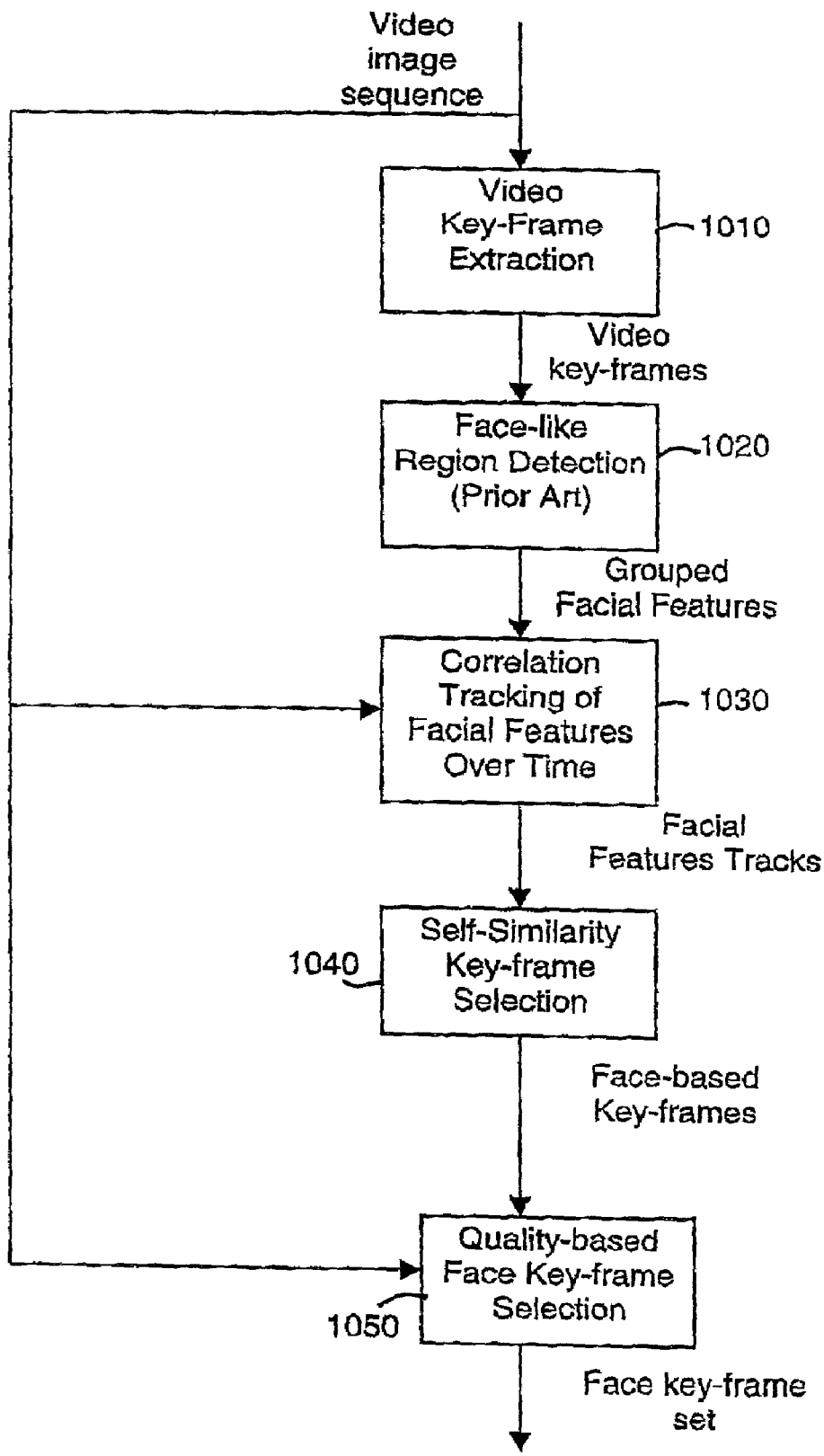
FIG. 10 is a flow chart for selecting key-frames based on detecting and tracking single-face regions.

The procedure for video face key-frame detection is outlined in FIG. 10. The video image sequence is processed by the live video key-frame extraction module 1010. This module may be implemented by a prior art method as outlined in FIG. 1A, or as taught by the present invention. Alternatively, face detection may be applied to a subset of the video image sequence obtained for example by even temporal sub-sampling.

In each key-frame, a face like region detection method (1020) is applied. Preferably, this detection method as taught by the prior art, locates facial features. Such features generally consist of eye features and usually also mouth and nose features.

FIG. 10, illustrates face key-frame detection for a single face region. Starting with grouped facial features as output by 1020, these features are tracked over time (that is from frame to frame). Preferably, the facial features are tracked from frame to frame (1030) by correlation tracking as known in the prior art.

Gwen a track (that is, location data for facial features in a set of video frames), face-based key-frames are selected along this track. In the preferred embodiment the selection is implemented by a two-step process based on consecutively applying two criteria: (1) face self-similarity (1040), and (2) face quality index (1050).

Figure 11:
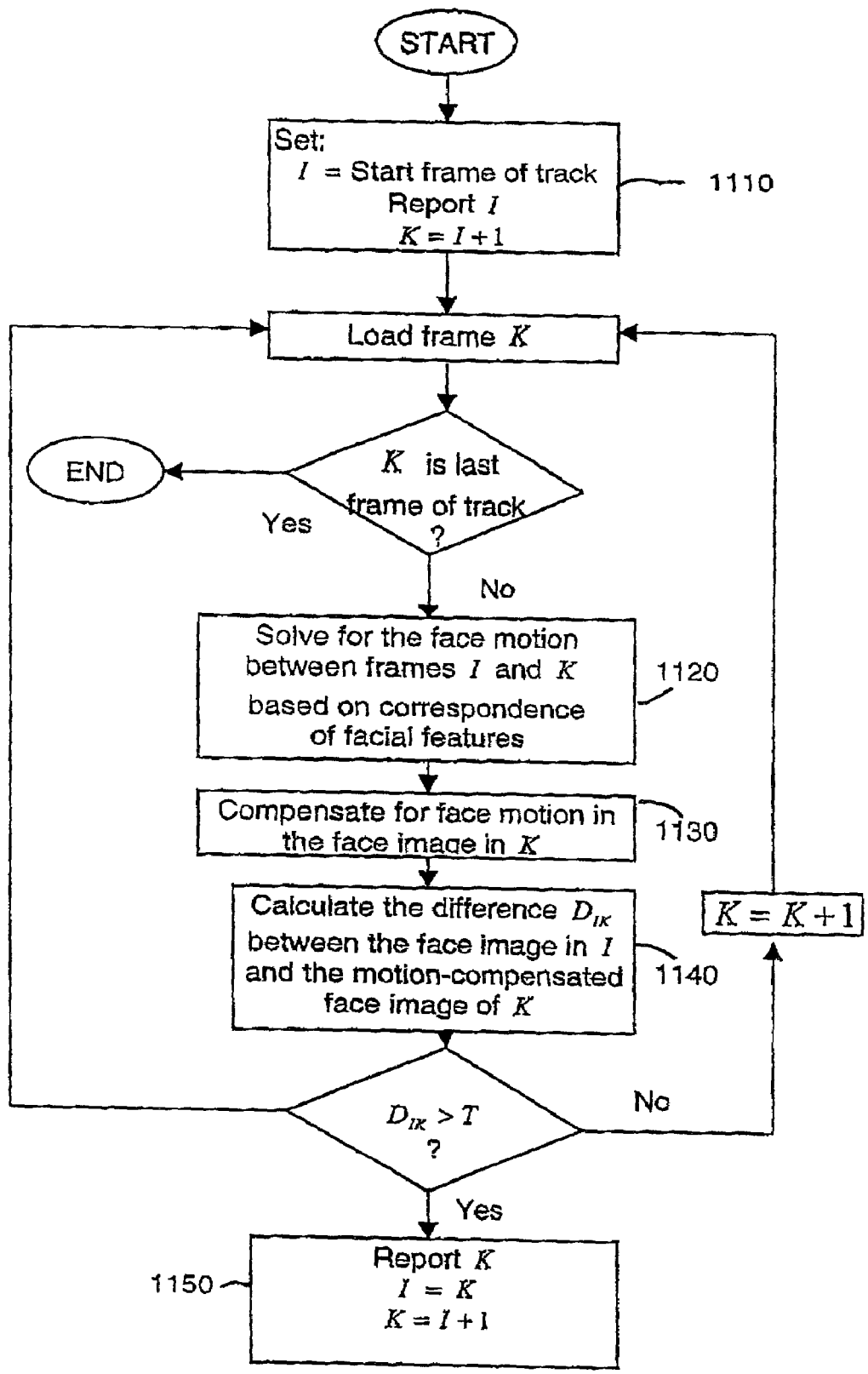
FIG. 11 is a flow chart for selecting face-based key-frames from tracks of facial features.

Regarding the face self-similarity criterion, segments of contiguous frames of similar face appearances can be reduced to a single interim key-frame. In the preferred embodiment (FIG. 11) the first frame in the track is selected as an interim key-frame I. Each subsequent frame K in the sequence is tested. Given I and K, the face-like region image in K is compensated for the face motion from I to K (modules 1120,1130), where said motion is computed from the matched facial features (as extracted from the face track data). The compensated region is then subtracted from the corresponding face image in I (module 1140) and the difference value is used to decide whether K is sufficiently similar to be included in the current segment, or if K is sufficiently non-similar to start a new segment, with K the new faced-based interim key-frame.

The face quality index criterion, is then applied to all the selected face-based interim key-frames. In applying the quality index criterion, the score is preferably computed from correlation values of eyes and mouth candidate regions with at least one eyes and mouth template set, respectively. However, the quality index may depend also on a face orientation score, wherein the face orientation score is computed from a mirrored correlation value of the two eyes. In another embodiment, the face centerline may be estimated from mouth and nose location, and the face orientation score is computed from the ratio of distances between the left/right eye to the facial centerline. In yet another embodiment, the face quality index may include also a measure of the occlusion of the face; in that embodiment an approximating ellipse is fitted to the head contour, and the ellipse is tested for intersection with the frame boundaries. In yet another embodiment, the ellipse may be tested for intersection with other regions.

Many video sequences include multiple faces. To select a subset of face-based key-frames for such sequence, each face-like region is tracked, key-frames are selected to produce a subset of key-frames as described in FIGS. 10 and 11, and then the subsets are combined (by frame index) to produce a combined set.

In a practical situation, neighboring key-frames in the union of subsets may include very similar face information. Such a situation increases both the size of the data in the store 250 in FIG. 2, and the computational cost of face searching, without any significant increase in face recognition probability.

Figure 12:
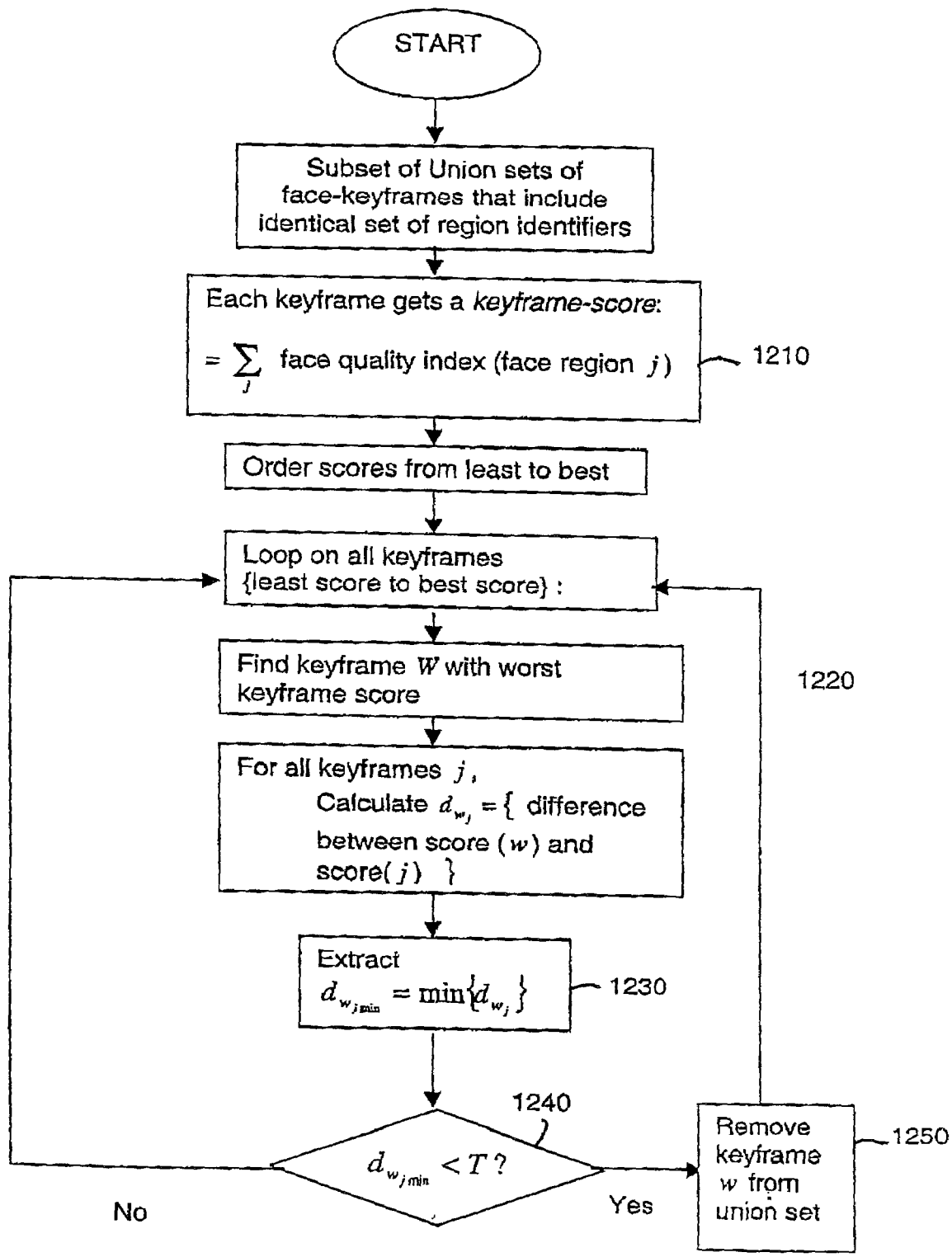
FIG. 12 is a flow chart for reducing the number of face-based key-frames.

The present invention also teaches how to reduce the combined set of key-frames. FIG. 12 illustrates a redundancy check that may be applied for face key-frames. Assuming that a unique identifier has been assigned to each face-tracked region, consecutive subsets of the combined set which include an identical set of region identifiers are grouped together. In each such subset, a total score is assigned to each key-frame (step 1210). In a preferred embodiment, the total score is set to the sum of face quality indices for all face-like regions. Then, repeatedly, the worst key-frame (in terms of the total score) is identified (step 1220). The distance from the worst key-frame to the remaining subset is defined to be the minimum face-content distance between that key-frame and all other key-frames in the combined set (step 1230). That face-content distance is defined to be the maximum distance between a face-region in one key-frame and the corresponding region in another key-frame, computed over all face-like regions in the two key-frames. In case that the distance from the worst key-frame to the remaining subset is below a specified threshold (step 1240), that worst key-frame is dropped from the combined set (step 1250). The process is repeated until no key-frame can be further dropped from the combined set.

While the description above relates to selecting key-frames based on facial images and post-processing such key-frames to optimize the resulting image recognition, it will be appreciated that the same technique can be used for selecting key-frames of other predetermined objects, e.g., the White House, the Eiffel Tower, the Washington Monument, etc.

The present invention thus teaches how to select key-frames from a video image sequence based on several criteria. In the described embodiments these criteria include live video content, graphic overlays, and faces (or other predetermined objects). When two or more such criteria are employed, the key-frame subsets obtained may be merged to yield a single, combined key-frame set. In merging the key-frames, each key-frame has associated with it a set of characteristic data, including for example, graphic overlay metadata, and face metadata. In combining the key-frame subsets, they are sorted by video frame index.

Figure 13:
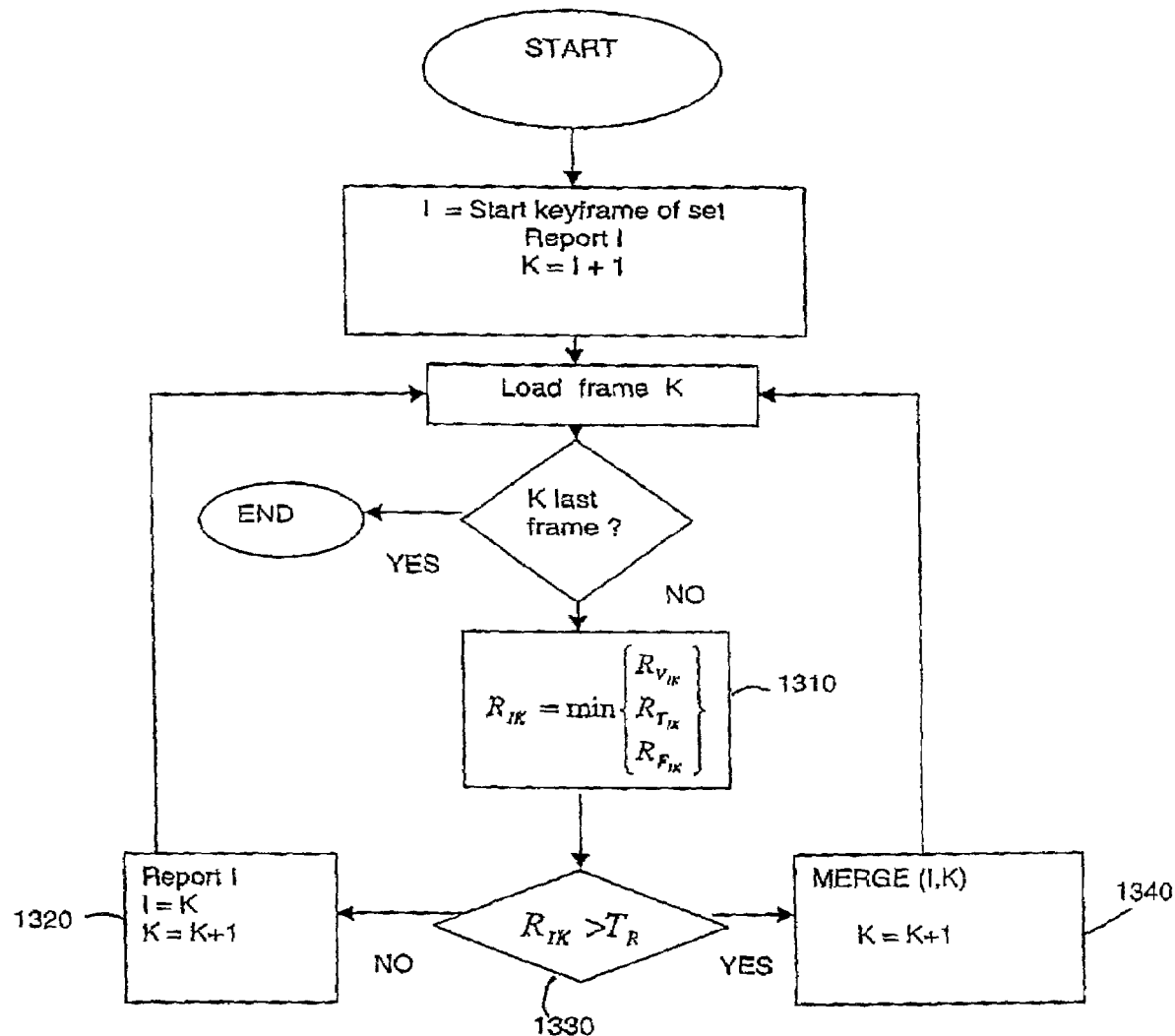
FIG. 13 is a flow chart for reducing the number of an entire set of key-frames, including live video key-frames, graphics overlay key-frames, and face-based key-frames.

The resulting combined set may also include redundant frames since key-frames selected to represent face content might be identical or similar to those selected to represent graphic overlays. While identical key-frames are easily identified, similar key-frames can be detected and reduced as well. FIG. 13 shows how to detect redundancy of key-frames taking into consideration live video, text or face content.

In FIG. 13, the process of reducing the combined set of key-frames is by means of checking for redundancy among neighboring key-frames along the time line. To further reduce the number of key-frames, adjacent pairs of key-frames are repeatedly tested for redundancy. In the preferred embodiment, the redundancy score of a pair of key-frames, $R_{IK}$, is defined to be the minimal redundancy score of all available criteria: live video, $R_{V_{IK}}$, graphics overlay (text, logos), $R_{T_{IK}}$, or face content, $R_{F_{IK}}$, (1310). The overall redundancy score is compared with a predefined threshold (1330). If that redundancy score is higher than a threshold, then the key-frames pair is reduced to a single key-frame by a merging step (1340).

In the merging step, the highest quality key-frame among the two is preserved. Preferably, face-quality is ranked highest, graphics-overlay second, and the overall video content third. Thus, if there is a face present in the two frames, the key-frame for which there is a higher face quality index will be preserved. If there is no face present, and there is a graphics overlay, the graphics metadata stored with the key-frames can provide information as to which key-frame may have the higher quality graphics overlay content present (e.g. highest score for text strings). If there is no face and no overlay content in the two adjacent frames considered, the overall live video content may be ranked by some other criteria, (e.g. quality, times, etc.), or a key-frame can be chosen arbitrarily.

In step 1340, the chosen key-frame among the two is preserved in the final set of key-frames. It is next considered as frame I, and the next neighboring key-frame is loaded as frame K. If no redundancy is found (1320), frame I is preserved in the final set of key-frames, and a new iteration is run with frame K now considered as frame I and the next neighboring frame loaded as frame K for the redundancy check.

While the invention has been described with respect to several preferred embodiments, it will be appreciated that these are set forth merely for purposes of example, and that many other variations, modifications and application of the invention may be made.

What is claimed is:

1. A method of selecting key-frames from a video sequence to produce a subset of key-frames for indexing, archiving, browsing and/or searching purposes, comprising the following steps:
    (a) producing an initial set of frames from said video sequence;
    (b) introducing each frame of said initial set sequentially into a 3-frame buffer to include a middle frame M, its preceding frame L, and its succeeding frame R;
    (c) testing for redundancy each M frame with respect to its preceding L frame and its succeeding R frame; and
    (d) selecting as a key-frame for inclusion in the subset those M frames tested to be non-redundant.

2. The method according to claim 1, wherein each M frame is tested for redundancy, with respect to its preceding L frame and its succeeding R frame, by:

representing the M frame as a combination of geometric
transformations applied to selected regions in the L and
R frames;

subtracting the geometric transformation of the L and R
frames from the M frame to produce difference images;
and determining from the difference images whether or note
the M frame is redundant.

3. The method according to claim 1, wherein each M
frame is tested for redundancy, with respect to its preceding
L frame and its succeeding R frame, by:

iteratively identifying motion entities having relative
motion between the M frame, its preceding L frame,
and its succeeding R frame;

utilizing the identified motion entities for identifying
regions in the M frame that can be transformed from the
L and R frames into the M frame;

transforming said identified regions in the M frame to the
corresponding regions in the L and R frames;

measuring the difference between said identified regions
and said corresponding transformed regions in the M
frame to produce difference images;

measuring the areas of said difference images by counting
the number of pixels of an intensity value above a
predetermined threshold; and discarding the M frame when said measured areas are less
than a prespecified area threshold.

4. The method according to claim 1, wherein:

some of the frames in the initial set include overlayed
frames having graphic overlays superimposed on live
video content, and non-overlayed frames having only
live video content;

before step (c), a mask is produced of the graphic overlay
in each overlayed frame and is utilized to remove the
graphic overlay from the live video content in the
respective overlayed frame;

step (c) tests for redundancy the live video content in both
the overlayed frames and the non-overlayed frames;
and step (d) discards those M frames tested to be redundant in
both the overlayed frames and the non-overlayed
frames, such that a subset of key-frames is produced
based on live video content in the overlayed frames and
the non-overlayed frames in the initial set.

5. The method according to claim 4, wherein at least one
overlayed frame is selected as an overlay key-frame and is
merged with the subset of key-frames produced based on
live video content.

6. The method according to claim 1, wherein at least some
of said frames in the initial set include frames containing an
image of a predetermined object and wherein at least one
such image frame is used for selecting a key-frame for
inclusion in the subset.

7. The method according to claim 6, wherein said at least
one image frame is used for selecting as a key-frame by:

detecting at least one such image in a frame in the initial
set;

tracking said at least one image through the video
sequence to produce a series of image frames;

computing at least one image-based metric for said image
from said series of image frames; and selecting a key-frame from said series of image frames
based on said at least one image-based metric.

8. A method according to claim 7, wherein said at least
one image-based metric includes an image self-similarity
index and is used to select a plurality of interim key-frames.

9. The method according to claim 8, wherein an image
quality index is applied to said interim key-frames to select
a key-frame for inclusion in said subset.

10. The method according to claim 1, wherein said initial
set of frames is the entire video sequence.

11. The method according to claim 1, wherein said initial
set of frames is produced by selecting every nth frame from
the video sequence where n is greater than 1.

12. The method according to claim 1, wherein said initial
set of frames is produced by selecting frames from the video
sequence based on a distance metric between frames.

13. A method of selecting key-frames from an initial set
of frames to produce a subset of key-frames for indexing,
archiving, browsing and/or searching purposes, comprising:
testing for redundancy each frame of the initial set with
respect to at least its preceding frame by:

representing the tested frame as a combination of geometric transformations applied to selected regions in
the preceding frame;

subtracting the geometric transformation of the preceding
frame from the tested frame to produce difference
images; and determining from the difference images whether or not the
tested frame is redundant, wherein said redundancy test
is made by:

iteratively identifying motion entities having relative
motion between the tested frame and its preceding
frame;

utilizing the identified motion entities for identifying
regions in the tested frame that can be transformed
from the preceding frame into the tested frame;

transforming said identified regions in the tested frame to
the corresponding regions in the preceding frame;

measuring the differences between said identified regions
and said corresponding transformed regions in the
tested frames to produce difference images;

measuring the areas of the difference images by counting
the number of pixels of an intensity value above a
predetermined threshold; and discarding the tested frame when said measured areas are
less than a prespecified area threshold.

14. The method according to claim 13, wherein each
frame is tested for redundancy also with respect to its
succeeding frame in the initial set of frames and is discarded
if redundancy is found in either the succeeding frame or in
the preceding frame.

15. A method of selecting key-frames from a video
sequence, which includes overlayed frames having graphic
overlays superimposed on live video content, and non-overlayed frames having only live video content, said
method comprising:

masking out from said overlayed frames the superimposed graphic overlays;

testing for redundancy the live video content of neighboring overlayed frames and non-overlayed frames;

selecting as key-frames the overlayed frames and non-overlayed frames whose live video contents were tested
to be non-redundant, selecting at least one overlayed
frame as an overlay key-frame; and merging each selected overlay key-frame with the key-frames selected on live video content.

16. A method of selecting key-frames from a video
sequence for inclusion in a subset of key-frames, comprising:

detecting at least one predetermined image in the video
sequence;

tracking said at least one image through the video sequence to produce a series of image frames;

computing at least one image-based metric for said image from said series of image frames; and selecting a key-frame from said series of image frames based on said at least one image-based metric, wherein said at least one image-based metric includes an image self-similarity index and is used to select a plurality of interim key-frames.

17. The method according to claim 16, wherein an image-quality index is applied to said interim key-frames to select a key-frame for inclusion in said subset.

18. The method according to claim 16, wherein said predetermined image is a face, graphic or other object image.

19. A method of selecting key-frames from a video sequence, comprising:

selecting one subset of key-frames which represent at least one feature of the video sequence;

selecting at least one other subset of key-frames which represent at least one other feature of the video sequence; and combining said at least two subsets of key-frames to produce a combined set of key-frames, wherein said combining of the at least two subsets of key-frame comprises merging said subsets of key-frames to produce said combined set of key-frames;

testing pairs of adjacent key-frames in said combined set of key-frames for redundancy; and discarding one of the pair of adjacent key-frames where redundancy is found to be present in a tested pair.

20. A method as claimed in claim 19, where said combined set of key-frames includes a subset of key-frames selected on the basis of live video content.

21. The method as claimed in claim 20, where said combined set of key-frames includes a subset of key-frames selected on the basis of graphic overlays.

22. The method as claimed in claim 20, where said combined set of key-frames includes a subset of key-frames selected on the basis of face content.

23. The method according to claim 20, wherein the key-frame of a pair which is discarded when redundancy is found to be present is the key-frame of the pair found to have the lower quality index with respect to said live video content.

24. A method of processing a video sequence of frames including graphic overlayed frames having a graphic overlay super imposed on live-video content, comprising:

detecting regions of the graphic overlay in said sequence;

generating a mask image of said graphics overlay;

utilizing said mask image for separating said graphics overlay from at least one overlayed frame in the sequence for also generating thereby a live video content image in addition to said mask image; and selecting at least one key frame from said video sequence based on analysis of said live video content.

25. The method according to claim 24, wherein said mask image is used for selecting a graphic overlay key-frame from said video sequence.

26. A method of selecting key-frames from a video sequence for inclusion in a subset, comprising:

detecting at least two frames in the video sequence having a predetermined face image;

applying an image-quality metric to said detected frames; and selecting as a key-frame, for inclusion in said subset, the detected frame having the higher image-quality metric;

applying prior to said step of applying an image-quality metric an image-similarity metric to select a plurality of interim key-frames; and applying the image-quality metric to said interim key-frames to select the key-frame to be included in said subset.

* * * * *